United States Patent
Buckley et al.

(10) Patent No.: US 8,640,115 B2
(45) Date of Patent: Jan. 28, 2014

(54) ACCESS CONTROL IN MODULES FOR SOFTWARE DEVELOPMENT

(75) Inventors: Alexander R. Buckley, Cupertino, CA (US); Mark B. Reinhold, Menlo Park, CA (US); Karen M. P. Kinnear, Boxbourough, MA (US)

(73) Assignee: Oracle International Corporation, Redwood Shores, CA (US)

( * ) Notice: Subject to any disclaimer, the term of this patent is extended or adjusted under 35 U.S.C. 154(b) by 683 days.

(21) Appl. No.: 12/771,654

(22) Filed: Apr. 30, 2010

(65) Prior Publication Data

US 2011/0271251 A1     Nov. 3, 2011

(51) Int. Cl.
 *G06F 9/44* (2006.01)
(52) U.S. Cl.
 USPC ............ 717/162; 717/114; 717/116; 717/166
(58) Field of Classification Search
 None
 See application file for complete search history.

(56) References Cited

U.S. PATENT DOCUMENTS

| | | | |
|---|---|---|---|
| 6,748,396 B2 * | 6/2004 | Klicnik et al. ......................... | 1/1 |
| 7,444,631 B2 * | 10/2008 | Schwabe et al. .............. | 717/178 |
| 7,536,412 B2 * | 5/2009 | Blohm ................................ | 1/1 |
| 7,614,045 B2 * | 11/2009 | Kuck et al. .................... | 717/166 |
| 8,091,069 B2 * | 1/2012 | Rojer ............................ | 717/114 |
| 2002/0184226 A1 * | 12/2002 | Klicnik et al. ................ | 707/100 |
| 2004/0015936 A1 * | 1/2004 | Susarla et al. ................ | 717/166 |
| 2005/0097550 A1 * | 5/2005 | Schwabe et al. .............. | 717/162 |
| 2006/0070051 A1 * | 3/2006 | Kuck et al. .................... | 717/162 |
| 2007/0061796 A1 * | 3/2007 | Atsatt ........................... | 717/166 |
| 2008/0022260 A1 * | 1/2008 | Kinder et al. ................ | 717/116 |
| 2008/0313624 A1 * | 12/2008 | Iwamoto ...................... | 717/162 |
| 2009/0210865 A1 * | 8/2009 | Popov et al. .................. | 717/166 |

OTHER PUBLICATIONS

Irene Mavrommati et al., Visibility and accessibility of a component-based approach for Ubiquitous Computing applications the e-Gadgets case, 2002 IEEE, 5 pages, <http://150.140.28.20/files/30__Visibility%20 and%20accessibility%20of%20a%20component-based>.*

David Hutchison et al., Component-Based Software Engineering, 2006 CBSE, 403 pages, <http://link.springer.com/chapter/10.1007/11783565_29#page-1>.*

Eliane Martins et al., Constructing Self-Testable Software Components, 2001 IEEE, pp. 151-160, <http://ieeexplore.ieee.org/stamp/stamp.jsp?tp=&arnumber=941401>.*

Brent Hailpern, Extending Objects to Support Multiple Interfaces and Access Control, 1990 IEEE, pp. 1247-1257, <http://ieeexplore.ieee.org/stamp/stamp.jsp?tp=&arnumber=60313>.*

Alexandre Bergel et al., Classbox J Controlling the Scope of Change in Java, 2005 ACM, pp. 177-189, <http://dl.acm.org/citation.cfm?id=1094826>.*

Alessandra Toninelli et al., Semantic-based discovery to support mobile context-aware service access, 2007 Elseier, pp. 935-949, <http://www.sciencedirect.com/science/article/pii/S0140366407005440#>.*

* cited by examiner

*Primary Examiner* — Thuy Dao
*Assistant Examiner* — Cuong V Luu
(74) *Attorney, Agent, or Firm* — Park, Vaughan, Fleming & Dowler LLP; Chia-Hsin Suen

(57) ABSTRACT

The disclosed embodiments provide a system that provides access control for a software program. During operation, the system identifies a member of a module to be used in the software program. Next, the system infers the visibility of the member based on the accessibility of the member. Finally, the system uses the visibility and the accessibility to provide access control during the life cycle of the software program.

8 Claims, 5 Drawing Sheets

ACCESS CONTROL IN MODULES FOR SOFTWARE DEVELOPMENT

RELATED APPLICATION

The subject matter of this application is related to the subject matter in a co-pending non-provisional application by inventors Mark Reinhold, Alexander Buckley, Jonathan Gibbons and Karen Kinnear and filed on the same day as the instant application entitled "Polyphasic Modules for Software Development," having Ser. No. 12/771,121, and filing date 30 Apr. 2010.

The subject matter of this application is also related to the subject matter in a co-pending non-provisional application by inventors Jonathan Gibbons, Alexander Buckley, and Mark Reinhold, entitled "Compile-Time Management of Polyphasic Modules," having Ser. No. 12/823,918, and filing date 25 Jun. 2010.

The subject matter of this application is also related to the subject matter in a co-pending non-provisional application by inventors Mark Reinhold, Alexander Buckley, and Jonathan Gibbons, entitled "Dependency Resolution in Polyphasic Modules," having Ser. No. 12/914,499, and filing date 28 Oct. 2010.

BACKGROUND

1. Field

The present embodiments relate to module-based systems for software development. More specifically, the present embodiments relate to techniques for providing access control using polyphasic modules.

2. Related Art

Within software systems, increasing sophistication and functionality are typically accompanied by corresponding increases in code size and complexity. For example, the addition of new features to a software program may require the implementation of new components, which in turn may increase the number of dependencies within the software program. Over time, changes to the software program may lead to increases in defects, debugging time, redundancy, and lack of readability. The continued development of a software system without effective complexity management may consequently reduce performance and increase maintenance risk to the point of rendering the software system unusable and/or unmanageable.

Issues associated with increasing software complexity may be mitigated by modularizing software systems. Modular software utilizes components that are self-contained and that facilitate a separation of concerns. For example, individual modules may be developed, tested, and used independently of one another in a software system. In addition, a module's functionality and dependencies may be explicitly declared through an interface provided by the module. Modularized software may thus be significantly more maintainable, easier to understand, and less complex than monolithic software.

Hence, increased use of modularity may improve the design, maintenance, performance, scalability, and growth of software systems.

SUMMARY

The disclosed embodiments provide a system that provides access control for a software program. During operation, the system identifies a member of a module to be used in the software program. Next, the system infers the visibility of the member based on the accessibility of the member. Finally, the system uses the visibility and the accessibility to provide access control during the life cycle of the software program.

In some embodiments, the member is a class or an interface.

In some embodiments, inferring the visibility of the member based on the accessibility of the member involves inferring the member as visible if the member is publicly accessible, and inferring the member as invisible if the member is not publicly accessible.

In some embodiments, using the accessibility to provide access control during the life cycle of the software program involves associating the member with a token, and using the token to control access to a module-private member during runtime of the software program.

In some embodiments, an accessing class is allowed to access the module-private member if the accessing class is associated with the token.

In some embodiments, the module contains a first portion of a package to be used in the software program, and a locally dependent module contains a second portion of the package.

In some embodiments, using the visibility and the accessibility to provide access control during the life cycle of the software program involves facilitating package-private access between the first portion of the package and the second portion of the package by loading the module and the locally dependent module in a common loader.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
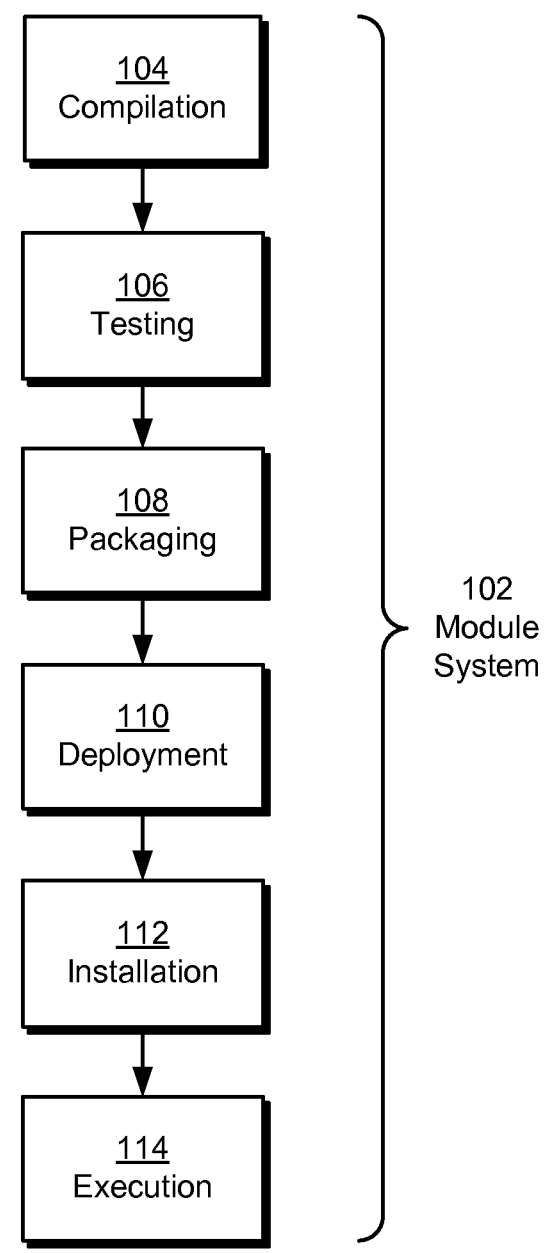
FIG. 1 shows the life cycle of a software program in accordance with an embodiment.

FIG. 1 shows the life cycle of a software program in accordance with an embodiment. The life cycle begins with a compilation 104 phase, in which source code for the software program is converted into an executable format. Next, the compiled software program undergoes a testing 106 phase to detect failures, defects, and/or other issues in the implementation of the software program. For example, testing 106 may be carried out to analyze the correctness, security, scalability, performance, maintainability, and/or usability of the software program.

After testing 106, packaging 108 of the software program may involve creating a software package in an archive format from the software program's executable code. The software package may then undergo deployment 110 and installation 112 on a computer system. For example, a web application may be deployed and installed on a server computer, while a native application may be deployed and installed on multiple personal computers. Finally, execution 114 of the software program allows the software program's intended functionality to be provided to an end user.

Those skilled in the art will appreciate that changes such as patches, upgrades, maintenance, and/or new releases may be periodically made to the software program. Moreover, such changes may be propagated through some or all of the phases of the life cycle. For example, the addition of new features to the software program may require that the software program be recompiled, tested, packaged, deployed, installed, and executed with the new features.

Those skilled in the art will also appreciate that changes to the software program may increase the complexity of the software program, which may eventually interfere with the maintainability, usability, and/or performance of the software program. For example, modifications to the software program may be difficult to document and/or track across all phases 104-114 of the software program's life cycle. Over time, such modifications may interfere with the continued use and development of the software program by obscuring the design of the software program, increasing redundancy, and introducing new, unknown dependencies between components in the software program.

To mitigate issues associated with increased software complexity, a module system 102 may be used to facilitate the development and maintenance of the software program. In one or more embodiments, module system 102 uses modular information at all phases 104-114 of the life cycle to manage dependencies in the software program. Such polyphasic modularization may facilitate the development of the software program by improving transparency, cohesion, performance, scalability, and maintainability in the software program. Moreover, such polyphasic modularization may be used to provide access control during all phases 104-114 of the software program's life cycle, as discussed below.

Figure 2:
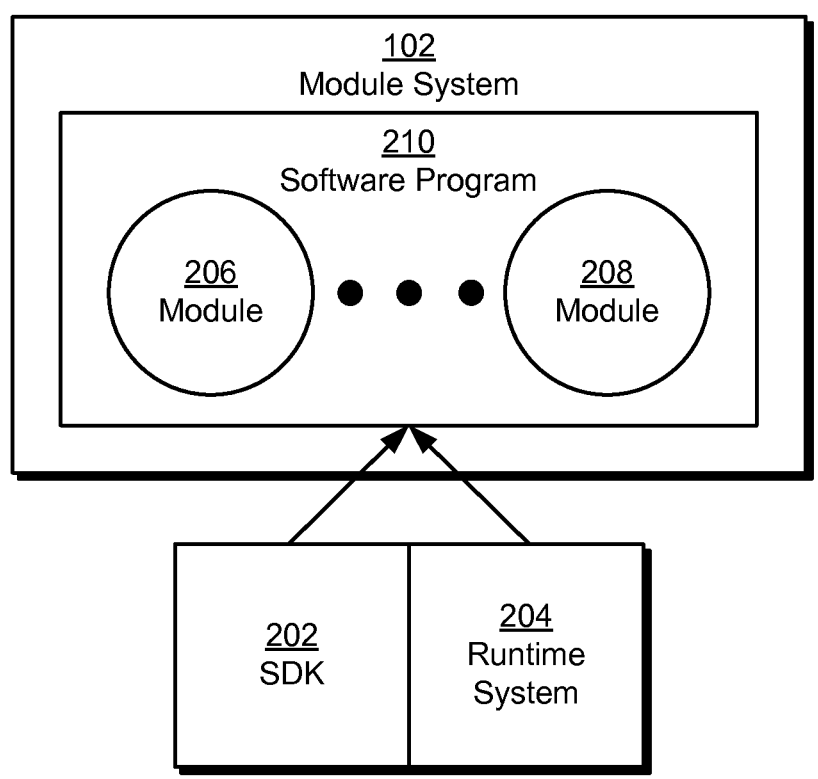
FIG. 2 shows the development and maintenance of a software program using a module system in accordance with an embodiment.

FIG. 2 shows the development and maintenance of a software program 210 using module system 102 in accordance with an embodiment. As shown in FIG. 2, a software development kit (SDK) 202 and a runtime system 204 may interact with module system 102 to manage software program 210 across all stages of the life cycle of software program 210. For example, SDK 202 and runtime system 204 may correspond to the Java (Java™ is a registered trademark of Sun Microsystems, Inc.) Development Kit (JDK) and Java Runtime Environment (JRE).

As mentioned above, module system 102 may use polyphasic modules to facilitate the development of software program 210. In particular, polyphasic modularization of software program 210 may begin with the creation of module declarations for a set of modules 206-208 to be used in software program 210.

In one or more embodiments, modules 206-208 correspond to standalone components in software program 210 that may be independently programmed, tested, and modified. Each module 206-208 may be defined, organized, and used through a corresponding module identity and module declaration. In addition, an interface to a module may be based on the members of the module. For example, the module may be accessed through public methods and/or data in the module's members. Logical boundaries between modules 206-208 may further be enforced by enabling inter-module interaction only through the interfaces to the modules, thus effectively hiding implementation details of modules 206-208 from one another.

In other words, modules 206-208 may correspond to encapsulated abstractions of functionality in software program 210 with well-defined capabilities and dependencies. Modules 206-208 may thus provide a large amount of flexibility in organizing the structure of software program 210. For example, Java classes may be grouped into modules 206-208 based on the functionality and/or use of the classes in software program 210 instead of language-based constraints such as package membership.

In one or more embodiments, module declarations for modules 206-208 are obtained separately from source code for software program 210. For example, module declarations for modules 206-208 in a Java program may be stored in "module compilation unit" files (e.g., "module-info.java") that are separate from source files containing Java classes, interfaces, enumerations, and/or annotation types. Such decoupling of module declarations from module implementations may further enable the creation of modules 206-208 based on factors that facilitate the design and development of software program 210, such as separation of concerns, scalability, and performance.

The independent creation and procurement of module declarations may additionally allow module system 102 to begin modularizing software program 210 before software program 210 is compiled. For example, module system 102 may allow module declarations for modules 206-208 to be created (e.g., using SDK 202) before development of source code for software program 210 is complete. Module system 102 may proceed with using the module declarations to manage dependencies in software program 210 through the compilation, testing, packaging, deployment, installation, and execution phases of the life cycle of software program 210. Managing dependencies using polyphasic modules and module declarations is discussed in a co-pending non-provisional application by inventors Mark Reinhold, Alexander Buckley, Jonathan Gibbons and Karen Kinnear, entitled "Polyphasic Modules for Software Development," having Ser. No. 12/771,121, and filing date 30 Apr. 2010, which is incorporated herein by reference.

In one or more embodiments, module system 102 uses module declarations for modules 206-208 to provide access control during the life cycle of software program 210. In particular, SDK 202 and runtime system 204 may include functionality to identify the members of each module in software program 210 using the module declarations and/or other information associated with software program 210. The visibility of each member may then be inferred based on the accessibility of the member. For example, the set of public members in the module may be inferred as the set of visible members of the module. As discussed below with respect to FIG. 3, the visibility and accessibility may be used to control access to individual members of the module, as well as the loading of modules and/or module members during runtime.

Figure 3:
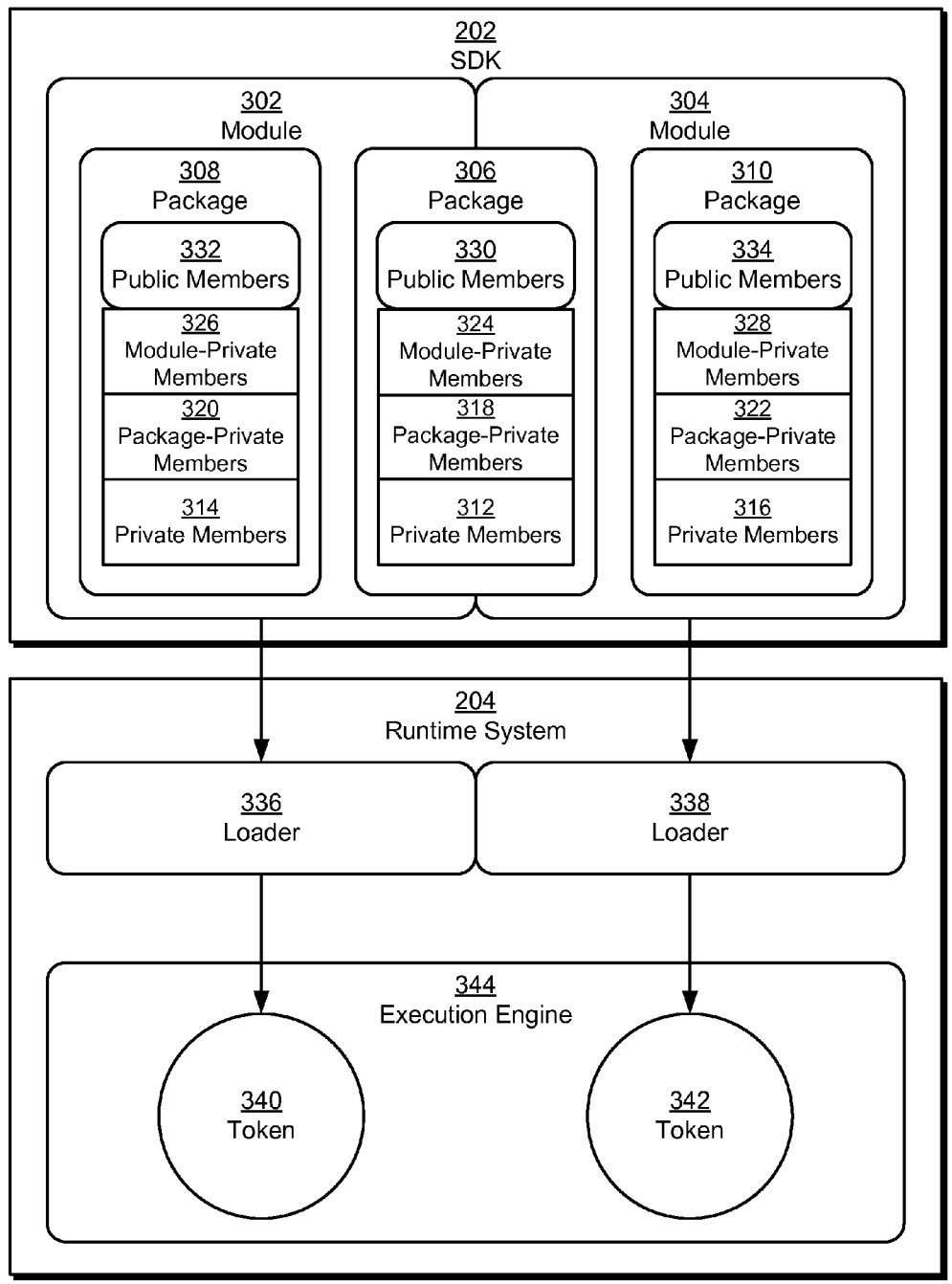
FIG. 3 shows an exemplary use of access control in a module system in accordance with an embodiment.

FIG. 3 shows an exemplary use of access control in a module system (e.g., module system 102 of FIG. 1) in accordance with an embodiment. As mentioned previously, SDK 202 and runtime system 204 may enable interaction with the module system. SDK 202 may be used to create a set of modules 302-304 to be used in a software program, such as software program 210 of FIG. 2. Runtime system 204 may then continue using modules 302-304 to execute the software program. In other words, SDK 202 and runtime system 204 may use modules 302-304 to manage dependencies throughout the life cycle of the software program.

As described above, modules 302-304 may correspond to standalone, isolated abstractions of functionality in the software program. For example, a computer game may include different modules for characters, environments, graphics rendering, physics, and/or other components of the computer game. Moreover, members of each module 302-304 may interact with members of the other module using an interface provided by the other module. For example, members of a graphics-rendering module for the computer game may obtain character and/or object positions from a physics module using method calls to the interface provided by the physics module. Consequently, modules 302-304 may provide a level of access control in the software program.

In one or more embodiments, module members are explicitly stated (e.g., in class or module declarations) and/or inferred. Inference of module members is discussed in a co-pending non-provisional application by inventors Jonathan Gibbons, Alexander Buckley, and Mark Reinhold, entitled "Compile-Time Management of Polyphasic Modules," having Ser. No. 12/823,918, and filing date 25 Jun. 2010, which is incorporated herein by reference.

Modules 302-304 may be further divided into a set of packages 306-310. Modules 302-304 and packages 306-310 may have a one-to-one, one-to-many, many-to-one, and/or many-to-many relationship with each other. Each module 302-304 may contain one or more packages 306-310, and at the same time, each package may be placed into one or more modules. As shown in FIG. 3, package 308 is wholly contained within module 302, package 310 is wholly contained within module 304, and package 306 is split between modules 302-304. More specifically, package 306 may be split between modules 302-304 such that each member of package 306 is in either module 302 or module 304 and does not clash with members of packages 308-310.

Packages 306-310 may be used to group related members of modules 302-304 and provide an additional level of abstraction and/or portability in the software program. For example, packages 306-310 may correspond to Java packages that contain related classes and/or interfaces. The functionality provided by packages 306-310 may thus require an additional level of access control in the software program.

In one or more embodiments, access control in the software program is based on module membership as well as package membership. All three packages 306-310 may contain public members 330-334, module-private members 324-328, package-private members 318-322, and private members 312-316. In one or more embodiments, public members 330-334, module-private members 324-328, package-private members 318-322, and private members 312-316 are differentiated by levels of accessibility in the software program. Access to private members 312-316 may only be class-wide, access to package-private members 318-322 may only be package-wide, access to module-private members 324-328 may only be module-wide, and access to public members 330-334 may be allowed throughout the software program.

In one or more embodiments, both visibility and accessibility are used to restrict access to members of modules 302-304. In particular, the classes and/or interfaces of a module may remain inaccessible to other modules even when the module is visible to the other modules. For example, a module containing only private classes may be visible to another module that declares a dependency on the module. Conversely, public members of a module may not be used by other modules if the module is invisible to the other modules.

To independently regulate visibility and accessibility between modules 302-304, SDK 202 and/or runtime system 204 may limit access to individual members of modules 302-304 using access levels (e.g., public, module-private, package-private, private) and dependencies. Furthermore, explicit declarations of module dependencies and access levels may be used to infer the inter-module visibilities of the members of modules 302-304. In one or more embodiments, a member of a module is inferred as visible if the member is publicly accessible and as invisible if the member is not publicly accessible. Public members 330-334 of each module 302-304 may thus be inferred as visible outside of the module, while all other may be inferred as invisible outside of the module.

The visibility and accessibility of each class and/or interface in modules 302-304 may be used to provide access control during the life cycle of the software program. For example, SDK 202 may enforce access levels associated with public members 330-334, module-private members 324-328, package-private members 318-322, and private members 312-316 by generating a compile-time and/or test-time error if a class in one module attempts to access a module-private member of another module.

In addition, the placement of packages 306-310 in modules 302-304 may be used during packaging to split the compiled software program into archives (e.g., Java archives (JARs)) and/or libraries. More specifically, the splitting of a package (e.g., package 306) into multiple modules may allow for the creation of libraries from modules that contain only parts of the package. For example, the smaller, frequently used portion of a large package may be placed into one module and the larger, remaining portion of the package placed into a different module. Each module may then be compiled into a different library for use by the software program. As discussed in further detail below, access to the smaller portion from the larger portion may be enabled if the module containing the larger portion declares a local dependency on the module containing the smaller portion. Consequently, the software program may omit the module containing the larger portion if only the smaller portion is used. The reduced size and number of libraries in the software program may additionally decrease overhead associated with deploying (e.g., downloading), installing, and/or executing (e.g., loading and linking) the software program.

Access control may continue to be provided by runtime system 204 after compilation, testing, and packaging in SDK 202. As shown in FIG. 3, runtime system 204 includes a set of loaders 336-338 and an execution engine 344. For example, runtime system 204 may correspond to a JRE, in which one or more Java class loaders (e.g., loaders 336-338) are used to load Java bytecode and/or JAR files into a Java Virtual Machine (JVM) (e.g., execution engine 344) for execution.

As discussed above, the software program may be divided into modules 302-304 that may be separately compiled, tested, and loaded by SDK 202 and/or runtime system 204. For example, each module may be associated with a different Java class loader to enable modules to be loaded at different times from different locations (e.g., filesystem and/or network locations). However, interaction among classes in the same package and/or module may be inadvertently restricted by the use of multiple loaders 336-338. For example, the splitting of a Java package into two JAR files that are then loaded into a execution engine by two different class loaders may cause runtime errors if a package-private class in one class loader attempts to access a package-private class in another class loader. Likewise, the loading of a module by multiple loaders may create issues with identifying module members during module-private access between classes in two different loaders.

To facilitate access among module-private members 324-328 of the same module in different loaders 336-338, loaders 336-338 may identify a runtime representation of the module using a token 340-342. Tokens 340-342 may be implemented in a variety of ways. For example, tokens 340-342 may correspond to alphanumeric keys, data structures, and/or executable code used to identify modules 302-304. Loaders 336-338 may additionally pass tokens 340-342 to execution engine 344 by loading each member of a module 302-304 into execution engine 344 with the corresponding token 340-342.

Execution engine 344 may then use tokens 340-342 to provide module-private access in the software program by allowing module-private classes with the same token to access one another, regardless of the loader (e.g., loaders 336-338) associated with each class. For example, a Java class may be identified in a JVM (e.g., using a defineClass method call) by the class's fully qualified type name, class loader, and token. During runtime, the JVM may allow an accessing class to access a module-private member of a module if the accessing class and module-private member are associated with the same token, even if the accessing class and the module-private member are loaded by different class loaders.

The use of tokens 340-342 may further allow the runtime representations of modules 302-304 to differ from the representations of modules 302-304 in SDK 202. For example, tokens 340-342 may be associated with classes based on class names, membership in packages 306-310 and/or modules 302-304, methods and variables, annotations, metadata, and/or locations. In other words, runtime system 204 may include functionality to associate classes and/or interfaces with modules differently from SDK 202, even if access levels and dependency mechanisms are common to both SDK 202 and runtime system 204.

In addition, runtime errors associated with the loading of split packages (e.g., package 306) by multiple loaders 336-338 may be mitigated through the use of local dependencies in SDK 202 and runtime system 204. In particular, a module may declare a local dependency on another module to ensure that both modules are loaded by a common loader. For example, the following module declaration may be used to declare a local dependency:

```
module N {
    requires O;
    requires local P;
}
```

Within the braces of the module declaration, the first line may declare a dependence of module "N" on module "O." That is, the module declaration for module "N" requires classes in module "O" to be visible. Runtime system 204 may load classes for module "N" and classes for module "O" with the same loader or with different loaders. On the other hand, the use of "requires local" in the second line may express a local dependence of module "N" on module "P." Upon detecting the local dependence (e.g., in the module declaration for module "N"), SDK 202 and/or runtime system 204 may modify the compilation, packaging, loading, and/or execution of the "N," "O," and "P" modules so that the "N" and "P" modules are loaded by the same loader.

Consequently, SDK 202 and runtime system 204 may mediate and facilitate interaction among public members 330-334, module-private members 324-328, package-private members 318-322, and private members 312-316 of modules 302-304, including package-private and module-private access in a runtime environment (e.g., runtime system 204) that uses multiple loaders 336-338. At the same time, modules 302-304 may enable fine-grained control of accessibility, visibility, packaging, and/or loading in SDK 202 and runtime system 204.

Figure 4:
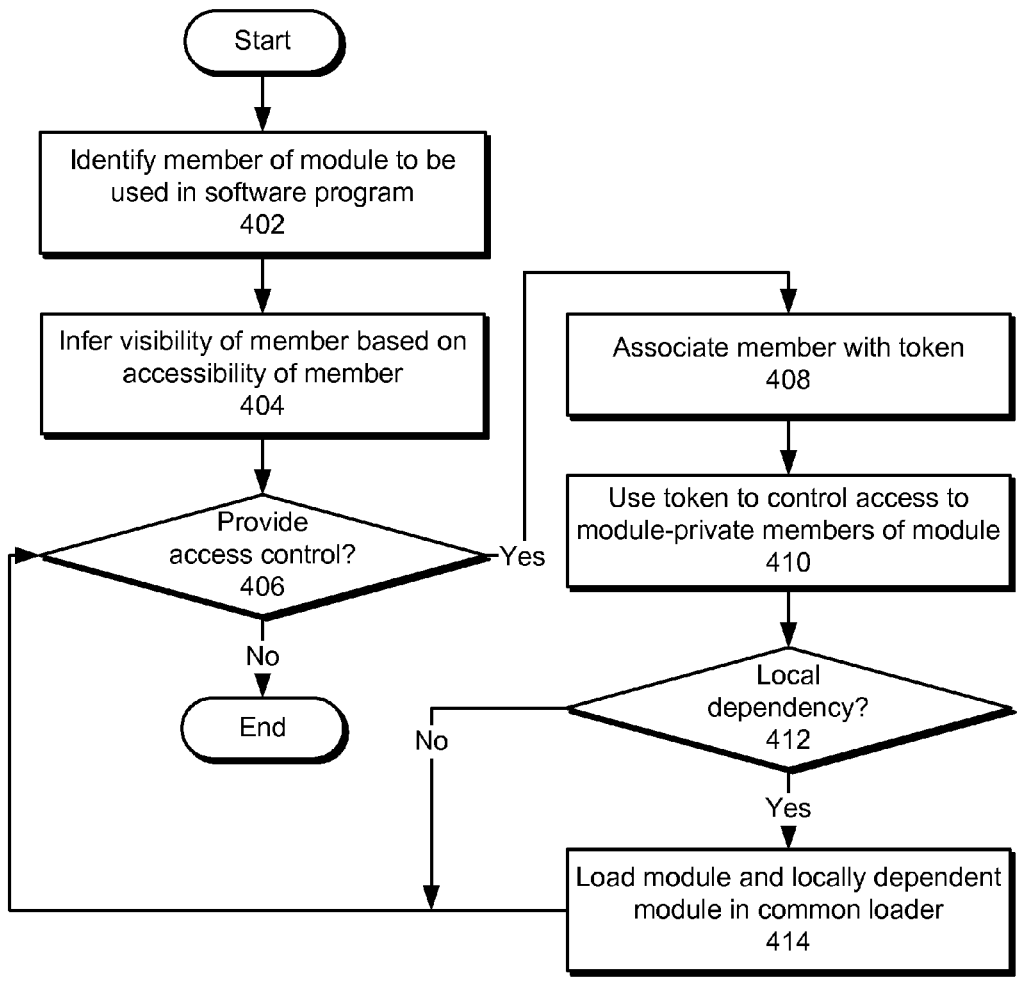
FIG. 4 shows a flowchart illustrating the process of providing access control during the life cycle of a software program in accordance with an embodiment.

FIG. 4 shows a flowchart illustrating the process of providing access control during the life cycle of a software program in accordance with an embodiment. In one or more embodiments, one or more of the steps may be omitted, repeated, and/or performed in a different order. Accordingly, the specific arrangement of steps shown in FIG. 4 should not be construed as limiting the scope of the embodiments.

Initially, a member of a module to be used in the software program is identified (operation 402). Members of the module may correspond to classes and/or interfaces. Next, the visibility of the member is inferred based on the accessibility of the member (operation 404). In particular, the member may be inferred as visible if the member is publicly accessible and as invisible if the member is not publicly accessible.

The visibility and accessibility may then be used to provide access control (operation 406) in the software program. First, the member may be associated with a token (operation 408), and the token may be used to control access to module-private members of the module and/or other modules (operation 410). The token may allow module-private access to occur if different parts of the module are loaded by different loaders (e.g., Java class loaders). For example, a runtime system (e.g., runtime system 204 of FIG. 2) for executing the software program may use the token to identify members of a runtime representation of the module. In other words, the runtime system may allow an accessing class to access a module-private member of the module if the accessing class is associated with the token.

The module may also be associated with a local dependency (operation 412). The local dependency may indicate that a package is split between the module and a locally dependent module. For example, a module declaration for the locally dependent module may contain a local dependency on the module. To facilitate package-private access between the split parts of the package, the module and locally dependent module are loaded in a common loader (operation 414). The use of the common loader may prevent issues associated with package-private access between classes in different loaders.

Access control may continue to be provided (operation 406) during the life cycle of the software program. For example, tokens may be associated with members of the module and/or other modules (operation 408) and used to control access to module-private members of the module(s) (operation 410) during execution of the software program, while local dependencies (operation 412) may be used to manage the loading (operation 414) of modules in the software program.

Figure 5:
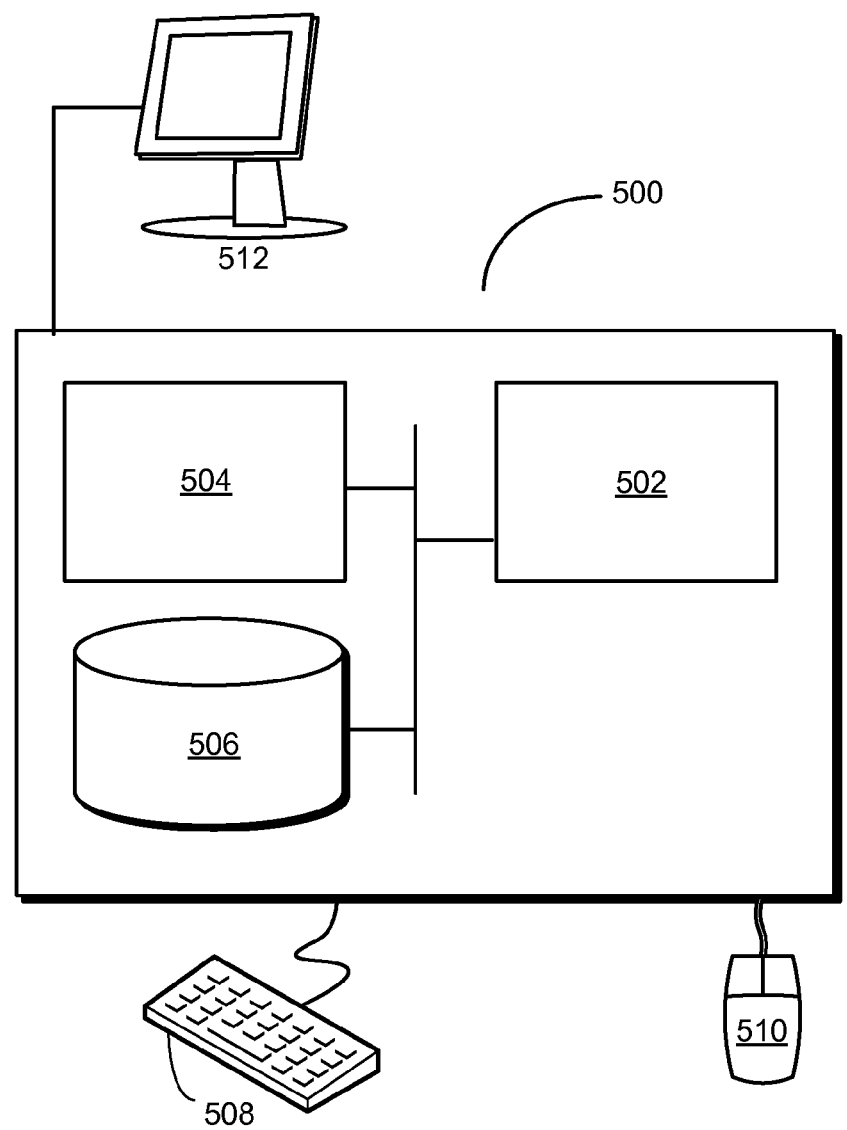
FIG. 5 shows a computer system in accordance with an embodiment.

FIG. 5 shows a computer system 500 in accordance with an embodiment. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for providing access control during the life cycle of a software program. The system may include an SDK and a runtime system. The SDK and runtime system may identify members of a module to be used in the software program. The SDK and runtime system may also infer the visibility of each member based on the accessibility of the member. The SDK and runtime system may then use the visibility and the accessibility to provide access control during the life cycle of the software program.

In addition, one or more components of computer system 500 may be remotely located and connected to the other components over a network. Portions of the present embodiments (e.g., SDK, runtime system, etc.) may also be located on different nodes of a distributed system that implements the embodiments. For example, the present embodiments may be implemented using a cloud computing system that provides a module system for managing the life cycles of software programs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for providing access control for a software program, comprising:
identifying a member of a module to be used in the software program;
inferring the visibility of the member based on the accessibility of the member; and
using the visibility and the accessibility to provide access control during the life cycle of the software program, wherein using the accessibility to provide access control during the life cycle of the software program involves associating the member with a token and using the token to control access to a module-private member during runtime of the software program;
an accessing class is allowed to access the module-private member if the accessing class is associated with the token;
wherein the module contains a first portion of a package to be used in the software program, and
wherein a locally dependent module contains a second portion of the package, wherein the module and the locally dependent module are loaded in a common loader to facilitate package-private access between the first portion of the package and the second portion of the package.

2. The computer-implemented method of claim 1, wherein the member is a class or an interface.

3. The computer-implemented method of claim 1, wherein inferring the visibility of the member based on the accessibility of the member involves:
inferring the member as visible if the member is publicly accessible; and
inferring the member as invisible if the member is not publicly accessible.

4. A system for providing access control for a software program, comprising:
a processor;
a software development kit (SDK) for the software program; and
a runtime system for the software program coupled to the processor, wherein the SDK and the runtime system are configured to:
identify a member of a module to be used in the software program;
infer the visibility of the member based on the accessibility of the member; and
use the visibility and the accessibility to provide access control during the life cycle of the software program, wherein using the accessibility to provide access control during the life cycle of the software program involves associating the member with a token and using the token to control access to a module-private member during runtime of the software program;
an accessing class is allowed to access the module-private member if the accessing class is associated with the token;
wherein the module contains a first portion of a package to be used in the software program, and
wherein a locally dependent module contains a second portion of the package, wherein the module and the locally dependent module are loaded in a common loader to facilitate package-private access between the first portion of the package and the second portion of the package.

5. The system of claim 4, wherein the member is a class or an interface.

6. The system of claim 4, wherein inferring the visibility of the member based on the accessibility of the member involves:
inferring the member as visible if the member is publicly accessible; and
inferring the member as invisible if the member is not publicly accessible.

7. A non-transitory computer-readable storage medium storing instructions that when executed by a computer cause the computer to perform a method for providing access control for a software program, the method comprising:
  identifying a member of a module to be used in the software program;
  inferring the visibility of the member based on the accessibility of the member; and
  using the visibility and the accessibility to provide access control during the life cycle of the software program, wherein using the accessibility to provide access control during the life cycle of the software program involves associating the member with a token and using the token to control access to a module-private member during runtime of the software program;
  an accessing class is allowed to access the module-private member if the accessing class is associated with the token;
  wherein the module contains a first portion of a package to be used in the software program, and
  wherein a locally dependent module contains a second portion of the package, wherein the module and the locally dependent module are loaded in a common loader to facilitate package-private access between the first portion of the package and the second portion of the package.

8. The non-transitory computer-readable storage medium of claim 7, wherein inferring the visibility of the member based on the accessibility of the member involves:
  inferring the member as visible if the member is publicly accessible; and
  inferring the member as invisible if the member is not publicly accessible.

* * * * *